United States Patent
Tian et al.

(10) Patent No.: US 12,415,818 B2
(45) Date of Patent: Sep. 16, 2025

(54) METHOD FOR SYNTHESIZING SILVER (I) TRIFLUOROMETHANETHIOLATE

(71) Applicant: Shandong Linghai Biotechnology Co., Ltd., Weihai (CN)

(72) Inventors: Yang Tian, Weihai (CN); Dayong Shi, Weihai (CN); Feng Xu, Weihai (CN)

(73) Assignee: Shandong Linghai Biotechnology Co., Ltd., Weihai (CN)

( * ) Notice: Subject to any disclaimer, the term of this patent is extended or adjusted under 35 U.S.C. 154(b) by 181 days.

(21) Appl. No.: 17/802,533

(22) PCT Filed: Feb. 18, 2022

(86) PCT No.: PCT/CN2022/076860
§ 371 (c)(1),
(2) Date: Aug. 26, 2022

(87) PCT Pub. No.: WO2022/179448
PCT Pub. Date: Sep. 1, 2022

(65) Prior Publication Data
US 2024/0209003 A1    Jun. 27, 2024

(30) Foreign Application Priority Data
Feb. 25, 2021 (CN) .......................... 202110211672.7

(51) Int. Cl.
*C07F 1/10*    (2006.01)
(52) U.S. Cl.
CPC ..................... *C07F 1/10* (2013.01)
(58) Field of Classification Search
CPC ........ C07C 319/02; C07C 323/03; C07C 1/10
See application file for complete search history.

(56) References Cited

U.S. PATENT DOCUMENTS

| | | |
|---|---|---|
| 2010/0331578 A1 | 12/2010 | Tohyama et al. |
| 2011/0054183 A1 | 3/2011 | Reichert et al. |
| 2012/0245388 A1 | 9/2012 | Tohyama et al. |

OTHER PUBLICATIONS

Zhao et al (Tetrahedron Letters 59, (2018) 1719-1722).*
Li et al (Organic Letters, 2013, vol. 15, No. 22 pp. 5898-5901).*

* cited by examiner

*Primary Examiner* — Jafar F Parsa

(57) ABSTRACT

The present invention relates to the technical field of organic compound synthesis, and particularly to a method for synthesizing silver (I) trifluoromethanethiolate. A method for synthesizing silver (I) trifluoromethanethiolate (CAS number: 811-68-7) is provided, which comprising synthesizing silver (I) trifluoromethanethiolate by using silver fluoride as a raw material, and using a trifluoromethanethiolate as a source providing trifluoromethylthio groups. In the present invention, the trifluoromethanethiolate is used as a source providing trifluoromethylthio groups, reacts with silver fluoride in a solvent to produce silver (I) trifluoromethanethiolate; and after separation and purification, a finished product of silver (I) trifluoromethanethiolate is obtained. The method for synthesizing silver (I) trifluoromethanethiolate according to the present invention has the advantages of readily available raw materials, easy preparation and low cost of reaction reagents and thus significantly reduced synthesis cost of silver (I) trifluoromethanethiolate, mild synthesis conditions, and simple and safe operations, thus facilitating the industrial production; and high utilization rate of silver atoms, and being green and environmentally friendly.

1 Claim, No Drawings

METHOD FOR SYNTHESIZING SILVER (I) TRIFLUOROMETHANETHIOLATE

TECHNICAL FIELD

The present invention relates to the technical field of organic compound synthesis, and particularly to a method for synthesizing silver (I) trifluoromethanethiolate.

BACKGROUND

Fluorine atoms play an important role in modern drug design and synthesis (Liu X, Xu C, Wang M, et al. Trifluoromethyltrimethylsilane: nucleophilic trifluoromethylation and beyond [J]. Chem Rev, 2015, 115(2): 683-730). Statistically, 15%-20% of modern drugs contain a fluorine-containing group (Hui R, Zhang S, Tan Z, et al. Research Progress of Trifluoromethylation with Sodium Trifluoromethanesulfinate [J]. Chin J Org Chem, 2017, 37(12): 3060-3075). The presence of a fluorine-containing group contributes to the increase in lipophilicity and metabolic stability of drug molecules (Yang B, Xu X H, Qing F L. Copper-mediated radical 1,2-bis(trifluoromethylation) of alkenes with sodium trifluoromethanesulfinate [J]. Org Lett, 2015, 17(8):1906-1909), and the reduction in development of drug resistance. Moreover, trifluoromethylthio (—SCF3) is one of the most lipophilic fluorine-containing functional groups currently available (Hansch parameter $\pi_R$=1.44). The introduction of this group into a drug can significantly change the lipid solubility of the drug and improve the bioavailability and biomembrane permeability of the drug. (Glenadel Q, Tlili A, Billard T. Metal-Free Direct Dehydroxytri-fluoromethylthiolation of Alcohols via the Umpolung Reactivity of Trifluoromethanesulfenamides [J]. Eur J Org Chem, 2016(11): 1955-1957).

Silver (I) trifluoromethanethiolate is an important nucleophilic trifluoromethylthiolating reagent, and plays an important role in a trifluoromethylthiolation reaction. However, the existing synthesis method therefor has the disadvantages of low utilization rate of silver atoms and production of more by-product silver sulfide (Zheng H D, Huang Y J, Weng Z Q. Recent advances in trifluoromethylthiolation using nucleophilic trifluoromethylthiolating reagents [J]. Tetrahedron Letters, 2016, 57(13): 1397-1409; Zhang P P, Lu L, Shen, Q L. Recent Progress on Direct Trifluoromethylthiolating Reagents and Methods [J]. Acta Chim. Sinica, 2017, 75, 744-769). As a result, the synthesis cost is higher and more waste is produced.

Therefore, the development of a new method for synthesizing silver (I) trifluoromethanethiolate to replace the existing synthesis process is of great significance for realizing the large-scale industrial production of silver (I) trifluoromethanethiolate.

SUMMARY

In view of the defects and disadvantages of the existing synthesizing method, an object of the present invention is to provide a new high-efficiency method for synthesizing silver (I) trifluoromethanethiolate. The method has the advantages of readily available reaction raw materials and trifluoromethylthiolating reagent, low cost, mild conditions, less waste and simple synthesis process.

To achieve the above object, the following technical solution is adopted in the present invention. A method for synthesizing silver (I) trifluoromethanethiolate (CAS number: 811-68-7) is provided, which comprises synthesizing silver (I) trifluoromethanethiolate by using silver fluoride as a raw material, and using a trifluoromethanethiolate as a source providing trifluoromethylthio groups.

In a preferred embodiment of the present invention, the reaction scheme for synthesizing silver (I) trifluoromethanethiolate is:

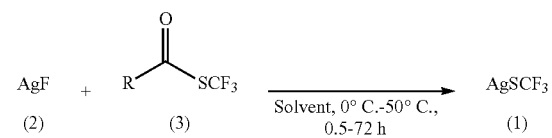

where in Formula (3), R is an arbitrary substituent; and the compound represented by Formula (1) is synthesized through a process including: dissolving the compound represented by Formula (2) and the compound represented by Formula (3) in a solvent, and reacting for a certain period of time at a specific temperature, to produce the compound represented by Formula (1), in which the solvent is an organic solvent;

in the reaction system, the molar ratio of the compound represented by Formula (2) to the compound represented by Formula (3) is in the range of 1:(1-10); and the reaction temperature is 0-50° C., and the reaction time is 0.5-72 hrs.

Further preferably, in Formula (3), R is any one selected from aryl, alkyl, alkenyl, alkynyl, halo, alkoxy, phenoxy, alkylthio, phenylthio, H, $NO_2$, and CN.

Further preferably, the solvent is any one of 1,2-dichloroethane, dichloromethane, acetonitrile, 1,4-dioxane, benzene, toluene, xylene, trifluorotoluene, N,N-dimethyl formamide, N,N-dimethyl acetamide, dimethyl sulfoxide, tetrahydrofuran, methanol, ethanol, isopropanol, hexafluoroisopropanol, and diethyl ether.

Compared with the existing synthesis method, the method for synthesizing silver (I) trifluoromethanethiolate of the present invention has the following beneficial effects:

(1) The trifluoromethylthiolation reaction reagent employed in the present invention is commercially available and easy to synthesize, thus significantly reducing the synthesis cost of silver (I) trifluoromethanethiolate, and facilitating the industrialized production.

(2) The synthesis method of the present invention has mild conditions, can be carried out at normal temperature and under normal pressure, and has low equipment requirements.

(3) The method has the advantages of simple and safe operations, mild reaction conditions, less waste, and being green and environmentally friendly.

DESCRIPTION OF THE EMBODIMENTS

The technical solutions in the embodiments of the present invention will be described clearly and fully hereinafter. Apparently, the embodiments described are merely some, rather than all of the embodiments of the present invention. All other embodiments obtained by a person of ordinary skill in the art without creative efforts based on the embodiments of the present invention shall fall within the protection scope of the present invention.

Examples 1 to 3 are mainly used to illustrate the wide applicability of the trifluoromethanethiolate used in the method of the present invention, and Examples 4 to 7 are mainly used to illustrate the fact that silver (I) trifluoromethanethiolate can still be obtained where the solvent, the reaction temperature, the reaction time, and other conditions are changed.

Example 1: In this example, silver (I) trifluoromethanethiolate was synthesized through the reaction of silver fluoride with S-(trifluoromethyl) [1,1'-biphenyl]-4-carbothioate (3a)

Reaction scheme

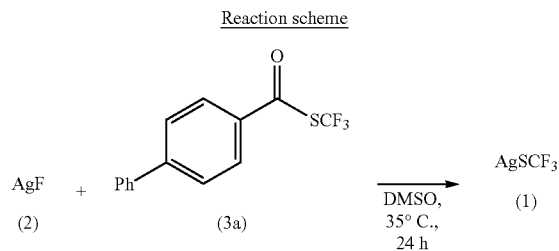

Synthesis steps and process: Silver fluoride (0.4 mmol, 51 mg), and S-(trifluoromethyl) [1,1'-biphenyl]-4-carbothioate 3a (1.0 mmol, 282 mg) were added to a 10 mL reaction tube equipped with a magnetic stirring bar, and then dimethyl sulfoxide (4.0 mL) was added. The reaction tube was fixed on a magnetic stirrer, and the reaction was carried out in an oil bath at 35° C. for 24 hrs. After separation and purification, the target product, silver (I) trifluoromethanethiolate, was obtained (yield 67.8%).

Example 2: In this example, silver (I) trifluoromethanethiolate was synthesized through the reaction of silver fluoride with S-(trifluoromethyl) dodecanethioate (3b)

Reaction scheme

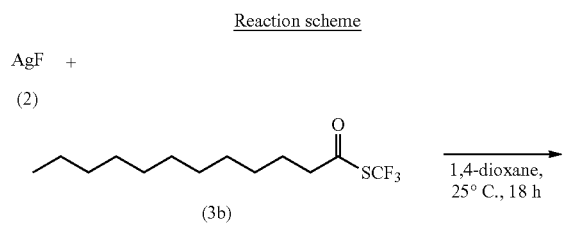

Synthesis steps and process: Silver fluoride (0.5 mmol, 63.5 mg) and S-(trifluoromethyl) dodecanethioate 3b (2.0 mmol, 568 mg) were added to a 10 mL reaction tube equipped with a magnetic stirring bar, and then 1,4-dioxane (4.0 mL) was added. The reaction tube was fixed on a magnetic stirrer, and the reaction was carried out at room temperature for 18 hrs. After separation and purification, the target product, silver (I) trifluoromethanethiolate, was obtained (yield 47.7%).

Example 3: In this example, silver (I) trifluoromethanethiolate was synthesized through the reaction of silver fluoride with S-(trifluoromethyl) 4-(trifluoromethyl)benzothioate (3c)

Reaction scheme

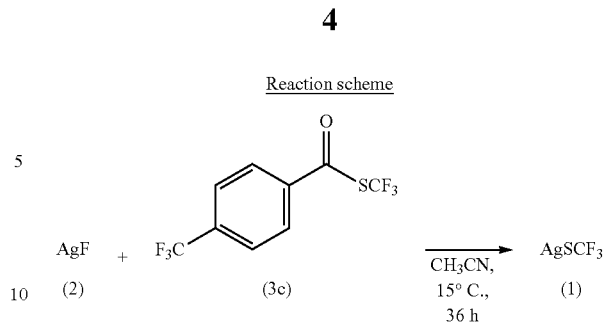

Synthesis steps and process: Silver fluoride (1 mmol, 127 mg) and S-(trifluoromethyl) 4-(trifluoromethyl)benzothioate 3c (1.0 mmol, 274 mg) were added to a 10 mL reaction tube equipped with a magnetic stirring bar, and then acetonitrile (3.0 mL) was added. The reaction tube was fixed on a magnetic stirrer, and then the reaction was carried out at 15° C. for 36 hrs. After separation and purification, the target product, silver (I) trifluoromethanethiolate was obtained (yield 72.5%).

Example 4: In this example, silver (I) trifluoromethanethiolate was synthesized through the reaction of silver fluoride with S-(trifluoromethyl) 4-(trifluoromethyl)benzothioate (3c)

Reaction scheme

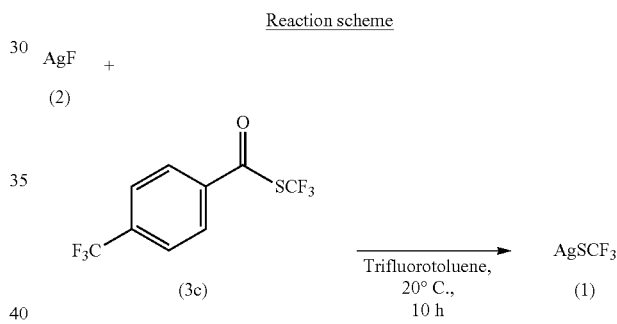

Synthesis steps and process: Silver fluoride (0.6 mmol, 76 mg) and S-(trifluoromethyl) 4-(trifluoromethyl)benzothioate 3c (3.0 mmol, 822 mg) were added to a 10 mL reaction tube equipped with a magnetic stirring bar, and then trifluorotoluene (4.0 mL) was added. The reaction tube was fixed on a magnetic stirrer, and then the reaction was carried out at 20° C. for 10 hrs. After separation and purification, the target product, silver (I) trifluoromethanethiolate was obtained (78.4%).

Example 5: In this example, silver (I) trifluoromethanethiolate was synthesized through the reaction of silver fluoride with S-(trifluoromethyl) 4-(trifluoromethyl)benzothioate (3c)

Reaction scheme

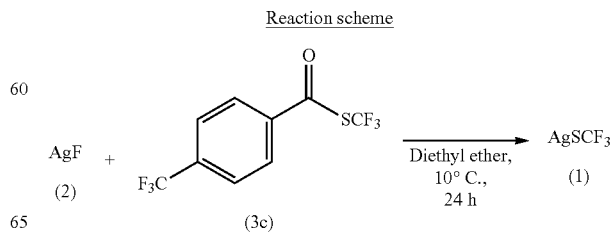

Synthesis steps and process: Silver fluoride (0.6 mmol, 76 mg) and S-(trifluoromethyl) 4-(trifluoromethyl)benzothioate 3c (3.0 mmol, 82.2 mg) were added to a 10 mL reaction tube equipped with a magnetic stirring bar, and then diethyl ether (4.0 mL) was added. The reaction tube was fixed on a magnetic stirrer, and then the reaction was carried out at 10° C. for 24 hrs. After separation and purification, the target product, silver (I) trifluoromethanethiolate, was obtained (yield 25.3%).

Example 6: In this example, silver (I) trifluoromethanethiolate was synthesized through the reaction of silver fluoride with S-(trifluoromethl) 4-(trifluoromethyl)benzothioate (3c)

Reaction scheme

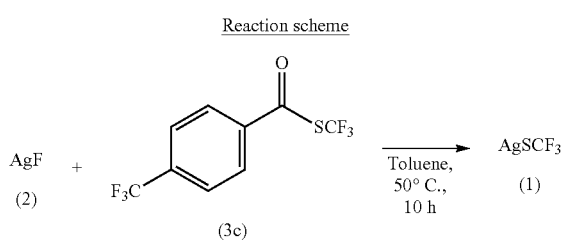

Synthesis steps and process: Silver fluoride (0.6 mmol, 76 mg) and S-(trifluoromethyl) 4-(trifluoromethyl)benzothioate 3c (3.0 mmol, 822 mg) were added to a 10 mL reaction tube equipped with a magnetic stirring bar, and then toluene (4.0 mL) was added. The reaction tube was fixed on a magnetic stirrer, and then the reaction was carried out at 50° C. for 10 hrs. After separation and purification, the target product, silver (I) trifluoromethanethiolate, was obtained (yield 43.4%).

Example 7: In this example, silver (I) trifluoromethanethiolate was synthesized through the reaction of silver fluoride with S-(trifluoromethyl) 4-(trifluoromethyl)berizothioate (3c)

Reaction scheme

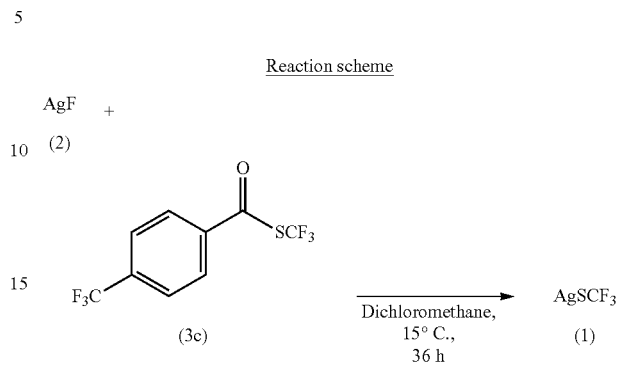

Synthesis steps and process: Silver fluoride (0.6 mmol, 76 mg) and S-(trifluoromethyl) 4-(trifluoromethyl)benzothioate 3c (3.0 mmol, 822 mg) were added to a 10 mL reaction tube equipped with a magnetic stirring bar, and then dichloromethane (4 0 mL) was added. The reaction tube was fixed on a magnetic stirrer, and then the reaction was carried out at 15° C. for 36 hrs. After separation and purification, the target product, silver (I) trifluoromethanethiolate, was obtained (yield 48.5%).

The method of the present invention can significantly reduce the amount of silver atoms used, and reduce the waste discharge, since cheap and readily available trifluoromethanethiolate is used as the source providing trifluoromethylthio groups to synthesize silver (I) trifluoromethanethiolate. Table 1 is a summary of the comparison between the method of the present invention and the existing popular method.

TABLE 1

Comparison between the method used in the present invention and the existing method

| Method | Literature source of method | Reaction scheme | Other problems/advantages |
|---|---|---|---|
| Previous popular method | Acta Chim. Sinica, 2017, 75, 744-769 | $3\ AgF + CS_2 \xrightarrow{140°\ C.} AgSCF_3 + Ag_2S$ | 1. The utilization rate of silver atoms is low, only one-third of the silver atoms is reacted into the product, and two-thirds of the silver atoms are reacted into waste silver sulfide<br>2. The reaction temperature is high<br>3. Water removal for carbon disulfide is complicated |
| Method of the present invention | — | $AgF + R\overset{O}{\underset{}{\text{–}}}SCF_3 \xrightarrow[0.5\text{-}72\ h]{\text{Solvent, } 0°\ C.\text{-}50°\ C.} AgSCF_3$ | 1. The atomic economy is high<br>2. No waste is produced, and the resulting product is a high value-added product.<br>3. The reaction conditions are mild |

What is claimed is:

1. A method for synthesizing silver (I) trifluoromethanethiolate (CAS number: 811-68-7), wherein a reaction scheme for synthesizing silver (I) trifluoromethanethiolate is:

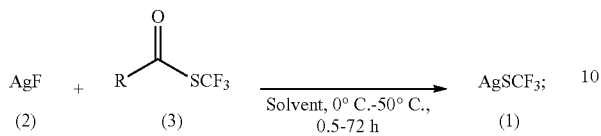

the method comprises:
dissolving a compound represented by Formula (2) and a compound represented by Formula (3) in a solvent, and reacting at 0-50° C. for 0.5-72 hours (hrs) to produce the silver (I) trifluoromethanethiolate represented by Formula (1);
wherein in Formula (3), R is selected from the group consisting of aryl, alkyl, alkenyl, alkynyl, halo, phenoxy, alkylthio, phenylthio, H, $NO_2$, and CN;
the solvent is selected from the group consisting of 1,2-dichloroethane, dichloromethane, acetonitrile, 1,4-dioxane, benzene, toluene, xylene, trifluorotoluene, N,N-dimethyl formamide, N,N-dimethyl acetamide, methanol, ethanol, isopropanol, hexafluoroisopropanol, and diethyl ether; and
in a reaction system, a molar ratio of the compound represented by Formula (2) to the compound represented by Formula (3) is in a range of 1:(1-10).

* * * * *